(12) United States Patent
Sanders et al.

(10) Patent No.: US 6,275,250 B1
(45) Date of Patent: Aug. 14, 2001

(54) FIBER GAIN MEDIUM MARKING SYSTEM PUMPED OR SEEDED BY A MODULATED LASER DIODE SOURCE AND METHOD OF ENERGY CONTROL

(75) Inventors: Steven Sanders, Belmont; David F. Welch, Menlo Park; Stuart MacCormack, Mountain View; Ramon E. Alvarez, Belmont, all of CA (US)

(73) Assignee: SDL, Inc., San Jose, CA (US)

( * ) Notice: Subject to any disclaimer, the term of this patent is extended or adjusted under 35 U.S.C. 154(b) by 0 days.

(21) Appl. No.: 09/235,125

(22) Filed: Jan. 21, 1999

Related U.S. Application Data (63) Continuation-in-part of application No. 09/085,142, filed on May 26, 1998, now Pat. No. 6,160,568.
(60) Provisional application No. 60/090,285, filed on Jun. 22, 1998.

(51) Int. Cl.[7] ............................... B41J 2/435; G02B 6/02
(52) U.S. Cl. ........................ 347/247; 347/246; 347/237; 385/126
(58) Field of Search ..................................... 347/237, 238, 347/239, 247, 255, 246; 385/123, 126, 124; 359/341; 372/6, 25, 24, 50, 26, 33, 38, 70, 75; 327/108, 109

(56) References Cited

U.S. PATENT DOCUMENTS

| | | | |
|---|---|---|---|
| 4,522,656 | 6/1985 | Kuhn-Kuhnenfeld et al. | 219/121.66 |
| 4,571,506 | * 2/1986 | Lisco | 327/109 |
| 4,652,722 | 3/1987 | Stone et al. | 219/121.76 |
| 4,727,235 | 2/1988 | Stamer et al. | 219/121.68 |
| 4,963,714 | 10/1990 | Adamski et al. | 219/121.63 |
| 5,225,923 | 7/1993 | Montagu | 359/199 |
| 5,263,036 | 11/1993 | DeBernardi et al. | 372/6 |
| 5,268,978 | 12/1993 | Po et al. | 385/33 |
| 5,329,090 | 7/1994 | Woelki et al. | 219/121.68 |
| 5,418,880 | * 5/1995 | Lewis et al. | 385/123 |
| 5,694,408 | * 12/1997 | Bott et al. | 372/6 |
| 5,717,450 | * 2/1998 | Hutt et al. | 347/232 |
| 5,719,372 | 2/1998 | Togari et al. | 219/121.61 |
| 5,734,412 | 3/1998 | Hasebe et al. | 347/247 |
| 5,867,305 | * 2/1999 | Waarts et al. | 359/341 |
| 5,887,009 | * 3/1999 | Mandella et al. | 372/6 |
| 5,946,334 | * 8/1999 | Ema et al. | 372/38 |

FOREIGN PATENT DOCUMENTS

| | | |
|---|---|---|
| 0 395 277 | 10/1990 | (EP) . |
| WO96/16767 | 6/1996 | (JP) . |
| WO96/41404 | 12/1996 | (WO) . |

OTHER PUBLICATIONS

Brian Rossi, entitled "Commercial Fiber Lasers Take on Industrial Markets", *Laser Focus World*, May, 1997.
Mark Wegmuller et al, entitled "Diode–Pumped Passively Mode Losked Nd3+—Dope Fluoride Laser Emitting at 1.05 micron: Novel Results"; IEE Journal of Quantum Electronics, vol. 34, No. 1, Jan., 1998.

* cited by examiner

*Primary Examiner*—N. Le
*Assistant Examiner*—Hai C. Pham
(74) *Attorney, Agent, or Firm*—W. Douglas Carothers, Jr.

(57) ABSTRACT

Double clad fiber gain medium systems particularly adapted for marking indicia on surfaces of articles are disclosed. These systems provide a modulated output from a pump or seed semiconductor laser source to a double clad fiber gain medium which provides an amplified marking output scanned over the article surface with an optical scanner forming a plurality of strokes, the completion of which results in the indicia.

41 Claims, 6 Drawing Sheets

FIBER GAIN MEDIUM MARKING SYSTEM PUMPED OR SEEDED BY A MODULATED LASER DIODE SOURCE AND METHOD OF ENERGY CONTROL

REFERENCE TO RELATED APPLICATION

This application claims priority benefits of provisional application Ser. No. 60/090,285, filed Jun. 22, 1998, and is a continuation-in-part of patent application Ser. No. 09/085,142, filed May 26, 1998, now U.S. Pat. No. 6,160,568, both of which are incorporated herein by their reference.

FIELD OF THE INVENTION

This invention relates generally to a laser marking system and more particularly to fiber laser marking systems operated cw or pulsed for marking surfaces of objects with information or data, hereinafter referred to as "indicia" which includes, for example, alphanumeric information, letters, words, personal or company logos, tradenames, trademarks, data or batch codes, numbers, symbols, patterns, article coding or identification, personalized signatures, and the like.

BACKGROUND OF THE INVENTION

Laser marking systems have been in existence for at least two decades or more for marking indicia on surfaces of articles. A major application of laser marking of articles is the identification or marking of an article, product or a product package, particularly with respect to high volume manufacturing lines where the desire is to mark the article or package "on-the-fly" as the same passes through a marking station. This type of marking provides data about the product, such as, date of manufacture, shelf life, factory origin, model and/or serial number, product tracking and the like. The use of lasers to provide marking indicia is preferred since it is not significantly physically intrusive, does not generally affect the integrity of the article or product or its packaging, and the marked indicia is not easily removable.

An example of traditional laser marking systems for these above mentioned applications are cw or pulsed $CO_2$ lasers and yttrium aluminum garnet (YAG), e.g., Nd:YAG lasers where the marking is accomplished by the heat of the applied laser beam. The wavelengths of the pulses produced by these systems are within the visible or infrared spectrum. Indicia to be marked is formed by using a mask through which the laser beam passes or by a focused laser beam which is moved or scanned to produce the desired indicia. Such lasers are also employed for engraving, soldering and welding wherein, in the case of marking, the surface layer of the material is melted, ablated or vaporized to produce discernible indicia. Also, this type of article marking may be accomplished by use of a chemical reaction at the article surface to be marked where certain coating agents on the surface of the article, which may be visually transparent, undergo a visible contrast change under the influence of a laser beam or laser pulses.

$CO_2$ lasers have been principally employed for marking plastic surfaces, such as IC packages. The laser beam from the laser is directed through a copper stencil to form the indicia on the plastic surface. However, due to the shrinkage of IC packages over the years, $CO_2$ lasers, in many cases, are no longer suitable since high quality indicia with good visibility are required for this particular application. However, low cost, lower marking quality $CO_2$ systems employing low cost X-Y galvanometer devices are still employed for applications not requiring high quality marking with high resolution indicia.

YAG lasers are extensively employed today for IC package marking as well as many other marking applications. YAG lasers have shorter wavelengths of operation permitting the marking of indicia on harder surfaces, such as ceramic material. The beam in the YAG marking systems is steered or scanned in one, two or three dimensions by means of a pair of displaceable mirrors mounted for rotation to displace a laser beam in orthogonal directions to form a two-dimensional scan of the beam on the surface to be marked, such as, for example, a X-Y galvanometer device or a X—X galvanometer device operated via a controller under computer control. Examples of two-dimensional scanners are disclosed in U.S. Pat. Nos. 5,225,923; 5,329,090; 5,719,372; and 5,724,412. Indicia is scribed onto the surface of an article to be marked with fine resolution and marking clarity on comparatively smaller surfaces, such as in the case of small IC packages. A specific example of a YAG laser system for this type of marking is the scanning Nd:YAG laser called the Laser Marker SL475E, manufactured by NEC Corporation of Japan. The marking parameters of this system are as follows: (1) Laser Oscillator: SL114K, (2) Laser Type: cw Nd:YAG laser, (3) Output: 50 W or above, (4) Number of Marked Characters: 40, (5) Marking Method: One stroke or vector, (6) Power at Marked Surface: 1 W, (7) Scanning Speed: 100 mm/sec., (8) Bite Size: 30 $\mu$m; and (9) Q-Switch Frequency: 3 kHz.

The disadvantage of these $CO_2$ and YAG laser marking systems is the need in most instances for separate, expensive refrigerated chillers or water cooling units and corresponding cooler controller and power supply to maintain cooling of the cw operated laser diode arrays for pumping the YAG rod or cw operated $CO_2$ marking lasers. The chillers are required in $CO_2$ marking lasers due to the low efficiency in converting lamp pump light into a cw laser output.

Further, the modulation of these marking lasers is generally accomplished by means of modulating their optical output beams, such as with an acusto-optic modulator, to produce appropriate pulses for forming marking strokes or vectors that, together, form intelligent indicia on the article surface. As a result, as much as 20% to 30% of the power in the modulated output is lost due to this type of external modulation. The cw operation of these types of lasers is a waste of energy, requires continual maintenance of the lasers, and significantly reduces their overall lifetime utility. In the pulse mode, there is a large pulse-to-pulse variation in YAG marking lasers as they lack uniformity in the energy applied to the marking surface. Moreover, the external modulator, beside its high loss, does not last long in the field and needs to be replaced, and is an added and continuing cost to the laser marking system, along with its RF driver. Further, the YAG laser systems used for marking require first pulse suppression, i.e., when the laser is turned off the light has to be "bled off". Also, these systems with their associated cooling units and large power supplies and large laser head takes up a consider amount of floor space in a manufacturing facility just for the purpose of product marking.

What is needed is a less expensive marking laser system that provides for direct marking "power-on-demand", i.e., provides for marking output when indicia marking strokes are to be initiated and is completely extinguished when the indicia marking strokes are completed, while taking up minimal floor space.

It is an object of this invention to provide a fiber laser marking system pumped and modulated by a pump or seed diode pump source providing indicia marking power-on-demand.

SUMMARY OF THE INVENTION

According to one feature of this invention, a fiber gain medium marking system comprises a high power fiber gain medium consisting of a double clad fiber having a doped core surrounded by an inner pump cladding and providing an optical output for marking; a high power laser diode source for pumping the double clad fiber gain medium via an input into the inner pump cladding; and an optical scanner coupled to receive the marking output from the double clad fiber laser to scan the output over a surface of an article to be marked by sweeping the marking output in one, two or three dimensions to form strokes or vectors, the completion of which comprises indicia to be marked the article surface. The fiber gain medium marking system is characterized in that the laser diode source comprises a of plurality of discrete, separately mounted laser diode devices with their respective outputs individually coupled to a respective multimode fiber with the combined output ends of the multimode fibers fused and pulled into a single fiber output providing a multimode fiber output core. The use of separate devices eliminates the need for water cooling as used in the case of laser bars as such a source. This multimode fiber is spliced to a double clad fiber that has a cross-sectional dimension for its inner pump cladding that substantially matches the cross-sectional dimension of the pulled and fused multimode combined core. In cases where the surface geometry of the inner cladding is non-circular, such as a polygon-shape, it is preferred that the cross-sectional extent of the output multimode fiber core be equal to or slightly smaller than an inscribed circle of the inner cladding surface geometry so that there is no overfill of the pump light, resulting in a large leakage of the light from the double clad fiber. In another aspect of this feature of the invention, the discrete pump sources may be individually modulated, rather than modulated in unison, so that the contrast level of the resultant marking stroke or strokes produced by the marking output of the fiber gain medium can be altered "on-the-fly" to achieve different marking contrasts or different "grey levels" in the resulting indicia. This effect may be particularly useful in forming patterns, symbols or logos.

Another feature of this invention is the provision of a double clad fiber gain medium marking system providing a multiple marking output for simultaneous marking of more than one article.

A further feature of this invention is a double clad fiber marking system that comprises a two stage fiber amplifier for amplifying a modulated master oscillator comprising a laser diode signal source that is modulated to provide an amplified marking output.

The wavelength sensitivity of the articles to be marked must be taken into consideration. In order to effectively mark articles that are sensitive to shorter wavelengths, e.g., silicon wafers, the double clad fiber gain medium marking system may be utilized in combination with a frequency conversion device to provide for conversion to frequencies that are absorptive by an article to be marked. A specific example is a quasi-phase matching device employing a PPLN device to provide for frequency doubled marking outputs capable of marking indicia on silicon surfaces. Another example is a bulk phase matching device that is angle or temperature tuned.

Another feature of this invention is the provision of a drive circuit for a laser marking system that provides for an initial peak value in the ON-time of the modulated output that is initially higher than the later steady-state value of the output during the ON-time period. The employment of an initially higher ON-time peak value provides for shortening of the delay between the ON-time of the drive current and the ON-time of the optical marking output.

As used throughout this disclosure, the term, "modulated", is intended to cover cases where repetitive pulse modulation is utilized from the laser diode pump or seed source as well as to include cases where the marking output is turned ON and OFF in a manner to provide individual marking strokes, between which strokes positional scanning mirror adjustments in the scanner are accommodated for each subsequently produced stroke, the combination of individually scanned strokes producing discernible indicia on the surface being marked.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS OF THE INVENTION

Figure 1:
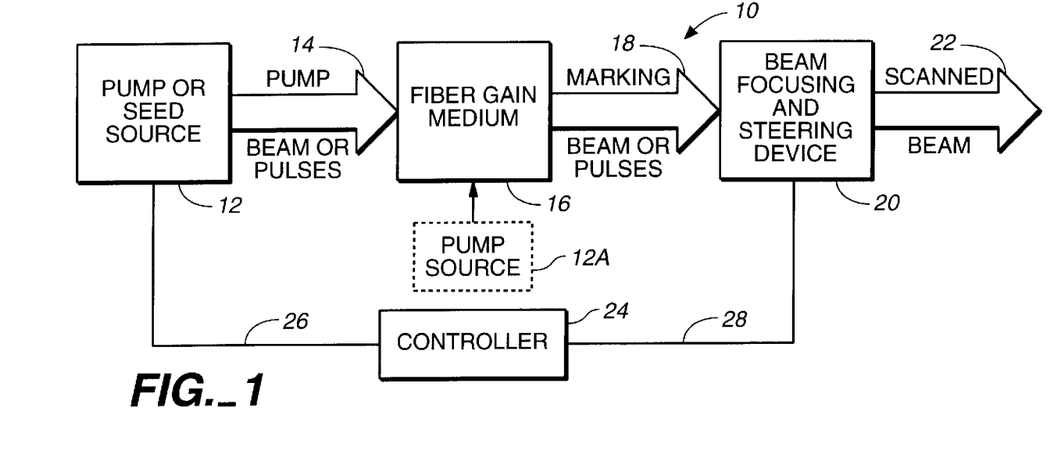
FIG. 1 is a schematic block diagram of a fiber gain medium marking system.
Figure 2:
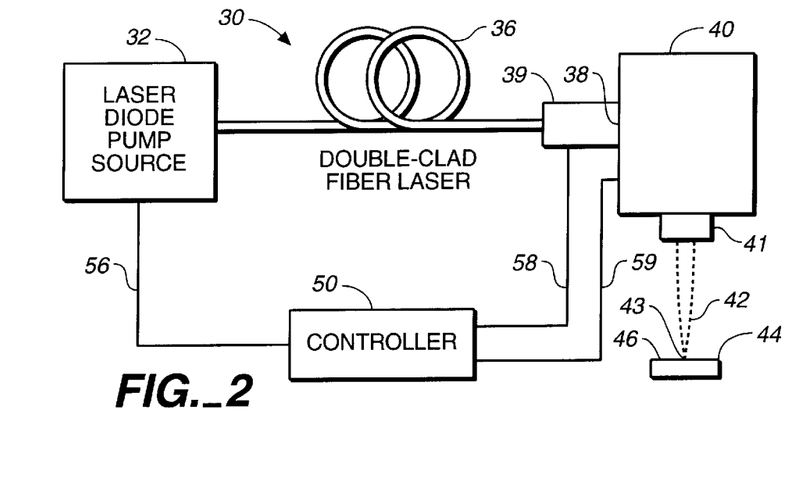
FIG. 2 is a more detailed version of the system shown in FIG. 1.
Figure 3:
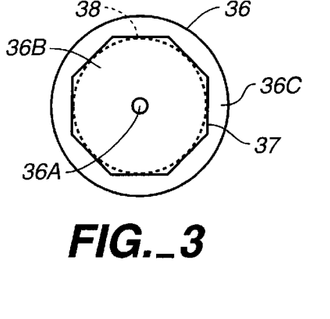
FIG. 3 is a cross-section of a double clad fiber geometry that may be employed in the fiber gain medium marking system used in this invention.

As general background, reference is first made to FIGS. 1–3 which are the subject matter, in part, of patent application Ser. No. 09/085,142, supra. FIG. 1 illustrates in block form a laser marking system 10 employing a fiber gain medium 16 in combination with a pump or seed source 12. Source 12 may be comprised of a single high power laser diode, a single laser diode bar, a plurality of laser diode arrays with their optical outputs combined, or a fiber laser source, for providing an output comprising a pump or seed beam or light pulses 14 for input into fiber gain medium 16. Fiber gain medium 16 is a double clad fiber having a single mode core surrounded symmetrically by a multimode inner pump cladding surrounded by an outer cladding, such as shown in U.S. Pat. No. 3,808,549, or a double clad fiber of the type shown in U.S. Pat. No. 4,815,079 and having a rectangular inner pump cladding, both of which are incorporated herein by their reference. Also, the double clad fiber may be of the types disclosed in U.S. application, Ser. No. 09/050,386, filed Mar. 30, 1998, and assigned to the assignee herein, having a polygon shaped inner pump cladding, such as, for example, D-shaped or octagonal-shaped, or of the type shown in published European patent application No. 0776074, published May 28, 1997, having a star-shaped or irregular surfaced inner pump cladding. Both this U.S. and European applications are incorporated herein by their reference.

Fiber gain medium 16 may be operated as a fiber laser pumped by a modulated semiconductor laser source 12 or as a fiber amplifier seeded by a modulated semiconductor laser source at 12 and pumped by other pumping sources 12A. The fiber amplifier may be a single stage amplifier or a multi-stage amplifier.

The output beam or pulses 18 from fiber gain medium 16 is coupled as an input into beam focusing and steering device 20. Device 20 focuses the marking beam 18 to a focal point at an image plane, which is at the surface of the object to be marked, while scanning the beam in two dimensions at the image plane. Such a device 20 is known in the art, examples of which are disclosed in U.S. Pat. Nos. 5,225,923; 5,719,372; and 5,734,412, which patents are incorporated herein by their reference. A computer 24, including its main controller (such as shown in U.S. Pat. No. 5,719,372, for example, except for control of pump laser rather than a Q-switch) is connected via lines 26 to pump source 12 to control the ON/OFF operation of source 12 as well as the amplitude, frequency or pulse rate and ON-time of the supplied current signal to source 12. As employed in this specification, "ON-time", means the rise characteristic of current to a maximum level as provided to the pump or seed source and the rise characteristic to the sustained intensity level of the marking output 44 produced by the fiber marking medium 16. "ON-time period" means the time that the fiber marking medium 16 or its corresponding pump or seed source 12 is producing an output.

Controller 24 is also connected by lines 28 to beam focusing and steering device 20 for controlling the two dimensional operation of the pair of X and Y galvanometer mirrors in the device to provide strokes through the sweep or scanning of beam 22. A series of such strokes produces an intelligent marking, such as indicia, on the surface of the article to be marked. It should be noted that device 20 may also be a one-dimensional (X—X) or three dimensional (X-Y-Z) scanning device. The beam 22 from device 20 is deflected in two dimensions at an image plane on the article surface by the pair of galvanometer mirrors in a manner known in the art and explained in the three previously incorporated U.S. patents, such as illustrated in FIG. 1 of U.S. Pat. No. 5,734,412. Controller 24 may include a conventional PC and include a marking circuit and timing board and operating software that provides coordinate information, via the marking circuit, on lines 28, to adjust the position and scan the galvanometer mirrors of scanner 20 to provide stroke paths for forming the indicia, such as characters or symbols, on the article surface. As an example, the letter "A" would comprise three strokes, the two angular side strokes of the letter and its cross bar stroke. The computer program provides coordinate information for each of these strokes so that, as controller 24 operates to provide current signals to pump source 12 to turn ON and turn OFF pump or seed beam or pulses 14, device 20 will correspondingly sweep the laser marking beam 22, via its galvanometer mirrors, to form the three stroke comprising the letter "A". Between formation of each of the strokes forming the letter "A", the scanned laser beam or output 22 may be terminated or extinguished through termination of operation of pump or seed source 12, during which time the galvanometer mirrors are positioned or repositioned to the coordinate point for the beginning of the next stroke for the letter "A" to be sequentially formed.

An important feature of laser marking system 10 in FIG. 1 is that it provides a laser marker that provided marking power-on-demand whereas prior laser marking systems employing YAG lasers require continuous operation with interruption of the marking beam by a modulator, for example, by Q-switching, as well as bleed circuitry to bleed off residual power in the laser cavity prior to initiation of the next stroke or mark. In addition, those employing $CO_2$ marking lasers require continuous operation with pulse width modulation. Also, these gas and solid-state laser devices generally require some kind of cooling such as refrigerated chillers and their power supplies, as necessary and additional equipment, to maintain the $CO_2$ lasers or the YAG diode pump lasers sufficiently cooled for cw operation. System 10 eliminates the need for such additional equipment and its control through a high power fiber marking laser, producing 9 W to 20 W or more of power for marking an article surface, and the modulated output to provide the marking strokes is accomplished by merely modulating the pump or seed source 12 supplying power to fiber gain medium marking 16. Pump or seed source 12 can be modulated by itself for power-on-demand to form strokes comprising indicia for marking or can, as well, be operated cw. Thus, the use of a modulator, such as an acusto-optic modulator in a Q-switched YAG laser system for providing a pulsed output, external of and within the axis of the optical output for marking, is not necessary and is eliminated. Such modulators are undesirable from the standpoint of stability of the produced output pulses and the reliability of the RF driver for the Q-switch, requiring frequent field service, provides an added cost to the marking system. They also reduce the power of the resultant output marking beam or pulses by as much as 20% to 30%.

In operation, controller 24 provides a pattern of control pulses to pump or seed source 12 while directing beam steering device 20 to move in two dimensions the marking beam energy across the article surface to be marked. The square or rectilinear pulses provided to pump or seed source 12 provide an output 14 that causes marking laser 16 to reach threshold and produce a series of light pulse fairly proportional to the amplitude of the electrical pulses, but delayed by several hundred microseconds due to the time response of the fiber gain medium 16. The pulse width and pulse frequency or repetition rate produced by source 12 may be varied to modify the duty cycle of the fiber marking medium 16 and the amount of marking energy applied in scanned beam 22 to the article surface. The amplitude level of the pulses in the case of a seed source 12 may be set to provide an output light pulse from fiber marking medium 16 that could typically be from 1% to 100% of the duty cycle without applying too excessive of a power level that may burn or otherwise cause different contrast levels in forming indicia strokes.

Also, another advantage of the fiber laser marking system 10 is that there is no requirement to discharge any residual energy prior to commencement of the marking process and the rendering of the first stroke or vector. The initial pump pulse or an initially higher intensity beam 14 in system 10 may be provided with additional energy or amplitude to bring about a quicker rise in population inversion in fiber laser 16 so that no gaps or missing stroke portions occur upon marking of the initial indicia stroke. Alternatively, a dummy mark may be provided at the initiation of the marking process to compensate for the failure of a portion of the first stroke to be printed should the marking beam sweep commence just prior to the commencement of the output of marking beam. This failure of marking the full extent of the first stroke may be due principally to a variance in or longer delay between the application of ON-time of the pump laser 12 and the output from the marking laser 16, which delay is different, and longer, if the marking system 10 has been idle for a period of time, such as a second or more, compared to continuous operation cw or at a pulse rate with pulse spacings of a few 100 μsec. In the latter case, there is some residual population inversion in fiber marking laser so that the energy level to achieve marking output 18 is sooner than in the case where all the energy in the fiber has dissipated with the system being idle for some period of time. Thus, the controller of system 10 may provide a dummy pulse after a predetermined period of time that the system has been idle to form the first marking stroke of indicia comprising the combination of the dummy mark pulse together with the completion of the pulse for the first indicia stroke.

Reference is now made to FIG. 2 which illustrates more detailed of a laser marking system 30 operating as a fiber laser. Specific details are set forth in U.S. patent application Ser. No. 09/085,142, supra. Fiber marking system 30 comprises semiconductor laser source 32 which may be comprised of a laser diode array, such as SDL Model No. 6460-P6, manufactured by SDL, Inc. of San Jose, Calif., providing a light output of about 17 watts. For higher light output, several semiconductor laser bars having multiple light emitters may be combined, such as employing a turning mirror, to produce a single output comprising as much as 28 W or more of pump output power, such as illustrated in U.S. Pat. Nos. 5,168,401 and 5,268,978, both of which are incorporated herein by their reference. These types of devices generally require some cooling to maintain a constant environmental temperature, such as employing a thermal electric cooler as is known in the art. These coolers are extremely small when compared to chillers used with gas or solid-stated marking sources, and are provided as part of the laser source package.

As seen in FIG. 3, double clad fiber 36 may be employed in system 30 and comprises a core 36A surrounded by a inner pump cladding 36B. Core 36A is doped with a rare earth material, as is well known in the art, such as Yb. Inner cladding 36B is surrounded by an outer cladding 36C. Core 36A may be comprised of a glass and have a diameter of about 3 to 10 μm whereas inner pump cladding 36B may have a diameter of about 100 μm to 200 μm. Inner pump cladding 36B is of a material, such as glass, that is of a lower refractive index than core 36A. Inner cladding 36C, surrounded by an outer cladding 36C, has a higher refractive index than outer cladding 36C to contain the pump light within inner cladding 36B. As is well known in the art, pump light is reflected back and forth at the interface between claddings 36B and 36C as the pump light propagates down the full length of the fiber so that, as the reflecting light criss-crosses the rare earth core 36A, it is absorbed in the core.

In order to form a lasing cavity for fiber 36 in FIG. 2, a mirror is provided at the input end of fiber 36 (not shown) which is coated to be transparent to pump light but is highly reflective at the lasing wavelength of fiber 36. The output end of fiber 36 is highly polished so as to form a partially internal reflecting surface, for example, having a reflectivity of about 4%, at the lasing wavelength of fiber 36. Thus, the polished facet and the mirror at fiber input together form the lasing cavity for double clad fiber marking laser 36. The output beam from marking laser 36 is coupled into a housing 39 which includes a lens for collimating the marking beam or output propagating out of the output end of fiber 36. A small portion of the marking output 44 is split off via a beam splitter (not shown) fixed with housing 39 to provide optical feedback via line 58 to controller 50 for controlling the power to diode laser pump source 32 and, in turn, to maintain the marking output of marking laser 36 at a predetermined intensity level, whether pump source 32 is operated cw or pulsed. Line 58 may be an optical feedback fiber for directing optical feedback to a photodetector in controller 50 or, alternatively, the photodetector may be in housing 39 and the analog signal derived from the photodetector is provided to controller 50 via signal line 58. Housing 39, with the collimating lens and beam splitter held in fixed relation within the housing is secured to an output end of a flexible length of fiber comprising fiber marking laser 36. Housing 39 is detachably secured to an input aperture 38 of scanner 40. Thus, the forward end of this tubular housing is easily mounted on an input aperture of scanner 40 and, as such, continually remains in proper optical alignment with the scanner input aperture. Therefore, no later field adjustments are necessary to this attachment as is true in the case of YAG marking laser systems where it may be necessary to realign the pulsed output from such YAG lasers to maintain proper optical axial alignment to the scanning mirrors of scanner 40.

As a specific example of the operating wavelengths of system 30, semiconductor laser source 32 operates with an emission wavelength within the range of about 900 nm to 930 nm, for example, 915 nm, which is within the absorption band of Yb. Fiber marking laser 36 will operate at a wavelength such as in the range of 1100 nm to 1110 nm. The length of fiber for laser 36 is made sufficiently long to provide for good depletion of the pump light along the length of the fiber. With the employment of a pump laser, such as SDL Model No. 6460-P6, comprising a laser diode bar with multiple light emitters with a 17 W output, power levels of 9 W can be achieved from high power double clad fiber laser 36. If a high power laser bar is employed, the combined total output as a source 32 is about 28 W resulting in an output from fiber laser 36 of about 15 W. In an already reported configuration, a 13.5 W laser diode pump source 32 operating at a wavelength of 807 nm, produced 5 W of CW single transverse mode output power at 1064 nm from a 45 to 50 meter long double clad, Nd doped fiber. The slope efficiency was 51%, although the overall optical conversion efficiency was only 40% due to losses at the optical interface between source 32 and fiber 36. These conversion efficiencies have, however, been presently improved to 60%. The marking output in system 30 can be focused to a spot size as small as 1 $\mu$m, but diameters of about 15 $\mu$m or less are adequate for most marking applications, with corresponding brightness of $10^9$ W/cm$^2$ sterdain due to the diffraction limited quality of the marking output from double clad fiber marking laser 36.

Also, it should be noted that if the high power operation of marking laser 36 causes SRS or high Raman gain, robbing the laser of its peak output at 1110 nm into other higher wavelengths, fiber grating filters may be employed in the laser cavity to filter out the SRS or fiber 36 may be bent about a core at an appropriate bend angle to permit the ejection of Raman wavelengths.

The employment of a double clad fiber as the laser marking source 36, versus a YAG laser or a single mode fiber, has several advantages. First, a single mode pump source at 32 is not required because the numerical aperture (NA) of the inner pump cladding 36B is quite large in view of its diameter so that multimodes propagate along the pump cavity. Tight control over the pump source wavelength is not required and is unnecessary because of the large spectral absorption bandwidth of the rare earth doped fiber 36, e.g., the absorption spectrum for Yb.

Second, the double clad fiber is essentially pumped along its entire length due to the cladding cavity so that more power can be absorbed into the fiber core over a fiber length sufficient to absorb almost of the pump light, rendering a much higher power gain medium compared to that possible with a single mode fiber. Also, in a YAG system, the pumping length along the YAG rod is materially less so that there is a much larger thermal load that causes changes or shifts in the refractive index of the YAG rod leading to mode distortion and pulse outputs characterized by optical non-uniformity in pulse-to-pulse power. Also, the use of double clad fiber as a laser marking power source increases the overall optical conversion efficiency to 60% or more which is higher than conventional single mode (TEM$_{00}$) laser marking systems employing CO$_2$ and YAG lasers.

Third, if a fiber of the type taught in U.S. patent application Ser. No. 09/050,386, supra, as illustrated in FIG. 3, greater amount pump power can be absorber in a comparatively shorter length of double clad fiber. This type of polygon inner pump cladding configuration is a preferred embodiment for the double clad fiber in this particular marking application since the inner cladding geometric configuration 37 in FIG. 3 induces the propagating pump light to reflect along the interface at many more different angles and criss-cross core 36A more often, greatly enhancing the amount of pump light absorption in core 36A within a shorter length of double clad fiber. However, other polygon configurations will also work as well to enhance the absorption. The configuration of FIG. 3 is, however, easier to manufacture than other polygon configurations suggested in the art for the inner pump cladding.

Fourth, the large NA of the inner pump cladding 36B permits a better match of the aspect ratio of the pump laser source 32 with the input end of inner pump cladding 36B resulting in a more efficient coupling between the pump laser source and fiber 36.

Fifth, system 30 pumped by a single laser bar, or other high power laser source capable of delivery power outputs of 15 W to 30 W or more, reduces system complexity while improving lifetime utility, compared to CO$_2$ and YAG laser systems, and does not require a bulky power supply, a refrigerated chiller and separate laser head as used in single mode (TEM$_{00}$) laser marking sources employing CO$_2$ or YAG lasers.

Referring again to FIG. 2, two dimensional scanner 40 is a device commercially available, such as Model No. HPM10A optical scan head available from General Scanning, Inc. of Watertown, Mass. The laser marking output from fiber marking laser 36 is received at input aperture 18 of scanner 40 and, through the use of a pair of fast-recovery galvanometer mirrors, one each for the X and Y axes, is scanned in two dimensions. The output beam 42 from scanner 40 may be focused by lens 41 and focused to a spot 43 at the image plane which is the surface 46 of an article 44 to be marked. The working field of scanner 40 at the focal plane at article surface 46 may be a square or rectangular that may be varied in size on a side from about 60 mm to about 180 mm depending on the chosen flat-field lens 41 employed at the output of scanner 40.

The power output of laser beam 42 is in the range of 5 W to 20 W or more, and is capable of vaporizing a thin surface layer off of top surface 46 of article 44. Article 44, may for example, be an encapsulated integrated circuit chip comprising a plastic resin material with a filler, such as carbon or the like. Scanned beam 42 will vaporize a thin surface layer from the resin package which leaves an exposed under-surface that is of a visibly different reflected contrast than surface 46 so that the indicia is discernible to the naked eye and provides for a permanent mark that cannot be easily removed and will not smudge. No additional printing medium or ink is necessary in the process. More importantly, large, deep removal of material from the package to provide the indicia is not necessary or desirable. High power CO$_2$ or YAG laser marking systems often remove material from the article surface forming holes and grooves as deep as 50 $\mu$m to 100 $\mu$m in the article surface to form the indicia marking. In system 30, the holes or grooves forming the strokes of the indicia on article surface 46 are in the range of about 6 $\mu$m to 27 $\mu$m, the higher end of this range being only in cases where the indicia strokes touch or cross one another on the article surface.

While the foregoing example relates to an integrated circuit chip marking application, laser marking system 30 may be employed for marking other materials, such as metals, ceramics, wood, glass, and other plastics and is, therefore, not limited to this particular application.

With further reference to FIG. 2, controller 50 for laser marking system 30 includes a personal computer 51 with conventional circuitry that provide digital signal control to scanner 40 via lines 59. Control functions are standard and known to those skilled in the art for the scanning system and accessible through the computer RS-232 interface using software provided by the scanner manufacturer called PC-MARK™ or PC-MARK MT™ and JOB EDITOR™ as well as machine and user interface software called RJE™, WINLASE™ and WINIC™, available from SDL, Inc. of San Jose, Calif.

An important factor and achievement in laser marking system 30, as well as subsequent fiber marking system embodiments, is characterized by a fiber marking medium being modulated through its optical pump or seed source rather than modulation of the output beam of the marking laser, such as in the case with an acusto-optic modulator. In FIG. 2, the intensity of marking output 44 is controlled for this purpose via light and signal feedback to control the current supplied to operate laser source 32. Controller 50 includes control circuitry for receiving a feedback signal via line 58, as previously explained. Controller 50 provides a drive current signal to laser source 32 proportional to the intensity of the optical marking output from fiber laser 36. The level of the drive signal to source 32 is determined by comparing the feedback signal with a reference via a comparator as explained in application, Ser. No. 09/085,142, supra.

Figure 4:
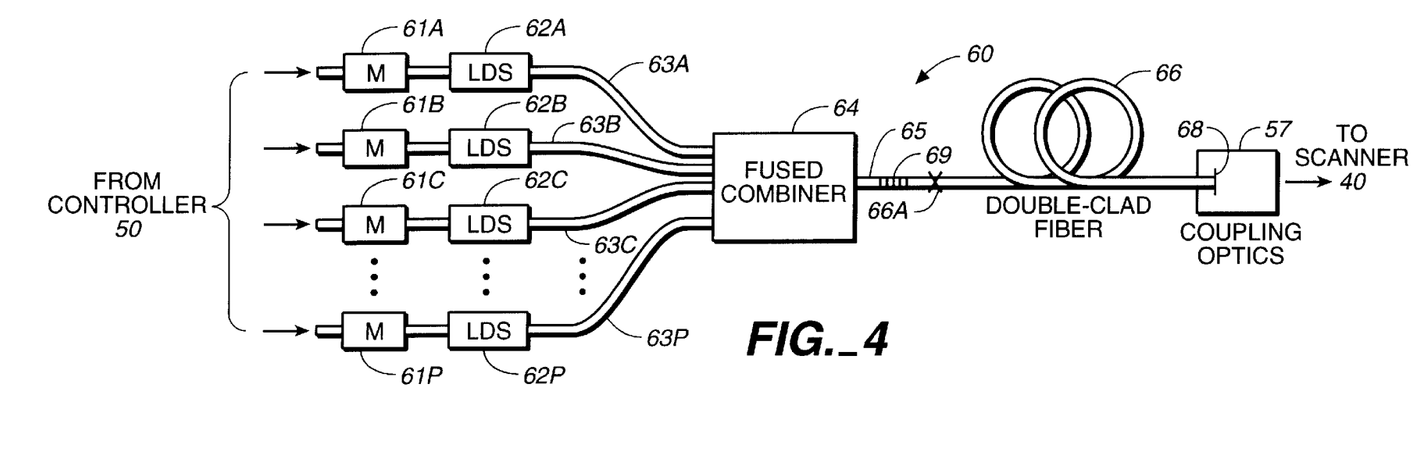
FIG. 4 is a schematic diagram of a first embodiment of a fiber gain medium marking system comprising this invention employing a double clad fiber marking laser modulated with a plurality of discrete pump semiconductor laser sources.

Reference is now made to FIG. 4 relating to a first embodiment of this invention. Marking system 60 comprises a plurality of discrete, separate laser diode pump sources 62A, 62B, 62C . . . 62P. Sources 62 may be modulated to provide power-on-demand to the fiber marking laser with a single modulator under the control of controller 50 (FIG. 2) operating all sources 62 in unison, or each source 62 may have its individual and separately controlled modulator 61A–61P, as shown in FIG. 4. Sources 62 may be individual diode lasers, laser bars or broad area lasers having apertures of 100 μm or more. In a particular embodiment here, sixteen discrete broad area lasers, such as with gain stripes having a width of 100 μm or 200 μm, operating at a wavelength of 915 nm with respective outputs of about 2 W. Obviously, more than sixteen sources can be combined. The output of pump sources 62A–62P are respectively connected to multimode fibers 63A–63P, each having a NA, for example, of about 0.16 and a core diameter approximately of 100 μm. The NA size is, therefore, sufficient to receive the output emission of a respective broad area laser. A microlens may be employed in the individual laser diode packages to couple the output from the individual laser diode sources into a respective multimode fiber 63. The output ends of the sixteen multimode fibers 63A–63P are formed into a fused combiner 64 to provide a combined output, for example, of 15 W to 30 W, taking into consideration coupling losses to the fibers and in the combiner as well as at its output splice to a single multimode fiber 65, which output splice is part of fused combiner 64. It should be noted that there is a reserve of additional combined output power from plural pump sources 62 for purposes of redundancy so that upon failure of one or more discrete pump laser diodes 62, the power output of remaining operative pump lasers can be increased to provide the desired output power level where the increase in pump power is averaged over the remaining pump lasers 62 in service.

Fused combiner 64 is formed by bundling together the output end portions of fibers 63, in absence of their outer cladding layers, heating the bundled fiber end portions to their molten state while pulling the bundled fibers to a point where its cross-sectional configuration fairly matches the cross-section of the multimode core of fiber 65. The fused combiner may be trimmed and then fused to the end of multimode fiber 65. The output multimode fiber 65 may, for example, have a core diameter of 200 μm to 230 μm with a high NA, such as 0.48. The pulled fiber bundle is pulled to a diameter of approximately 200 μm, trimmed, aligned and butt fused with the input end of multimode fiber 65.

Multimode fiber 65 is a short fiber and is spliced at 66A to a double clad fiber 66 which may have, for example, a cross-sectional configuration as shown in FIG. 3. As previously indicated, the outer geometry or shape 37 of inner pump cladding provides for more absorption of the pump energy along the length of the fiber so that the absorption length is comparatively shorter than in the case where the inner cladding is circular. It should be understood that the geometry need not be that as shown in the form of an octagon, such as shown at 37 in FIG. 3, but may be of any other polygon shape or a shape that is non-circular. The core 36A of fiber 66 is doped with a rare earth material, such as Yb or Nd. Fiber 66 functions as a fiber laser with an established cavity formed between input fiber grating 69 formed in multimode fiber 65 and polished output end 68 of double clad fiber 66. Grating 69 is formed in photosensitive fiber 65 by means well known in the art, such as by use of UV exposure via a grating mask. Grating 69 is transparent to the pump light, such as operating at 915 nm but reflective at the fiber lasing wavelength, such as 1100 nm. Also, as previously indicated, polished end 68 provides a level of reflectance at the lasing wavelength, e.g., about 4%, for reflecting this light back into the fiber laser cavity. The output of fiber 66 is coupled to coupling optics 67, which may be identical to that for housing 39 in FIG. 2, and the marking output from marking fiber laser 66 is provided as input to scanner 40.

An important aspect for the operation of marking laser system 60 is to achieve a good fusion splice at splice 66A in order to significantly reduce optical losses. These losses can be significant if the core diameter of multimode fiber 65 does not fairly match that of double clad fiber 66. Otherwise, if the multimode core diametrical size 38 of fiber 65 is larger, there will be overfill of light into fiber 66 resulting in significant light loss at splice 66A.

Figure 5:
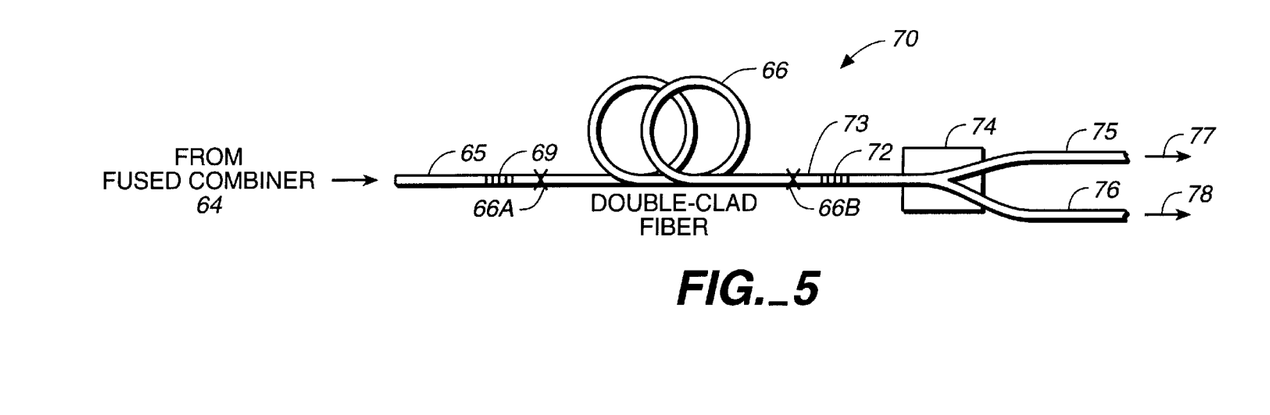
FIG. 5 is a schematic diagram of a second embodiment of a gain medium marking system comprising this invention employing a double clad fiber marking laser providing multiple outputs.

Reference is now made to the marking laser system 70 in FIG. 5, which is modified form of system 60 in FIG. 4 to provide a multiple marking output from fiber marking laser 66. In the case here, the end of double clad fiber 66 is spliced at 66B to a single mode fiber 73 which is coupled at its output end to two separate single mode fibers 75 and 76 via the 1:2 optical coupler 74. Fiber grating 72 is formed in fiber 73 to function as the laser cavity mirror to reflect a portion, such as 3%, of the lasing wavelength, such as at 1100 nm, back into the optical cavity of marking laser 66. The divided optical outputs 77 and 78 are provide separate scanners for sweeping these outputs in tandem to mark plural article with indicia through the use of a single modulated source comprising multiple pump diodes 63.

Generally, all the pump diode sources 62a–62P in FIGS. 4 and 5 are modulated synchronously. However, it should be noted that the contrast of the marking indicia can also be controlled by modulating less than all of the pump diodes 62 in order to reduce or enhance the contrast of the formed indicia or its component strokes formed on the marking surface, which effectively reduces or enhances the depth profile of the formed indicia or its component strokes. Thus, only a portion of the laser diode pump sources 62 are operated via their modulators 61A–61P to reduce contrast or additional pump sources are added to enhance contrast. Varying degrees of contrast can be achieved under program control via controller 50 to achieve multiple contrast levels at the article marking surface. Also, alternative, one or more such sources 62 may remain turn-ON (cw) while the others are synchronously modulated. This provides for faster turn-ON time (period 171 and 173 in FIGS. 12 and 13, respectively) with less ringing (175A in FIGS. 12 and 13).

An important aspect of this invention, however, is the cw operation of one or two broad area laser sources 62 to maintain double clad fiber 66 at the onset of its threshold of operation, e.g., at about 10 mW to 50 mW. The remaining broad area laser sources 62 are then modulated to bring double clad fiber 66 to higher power marking levels, such as 9 W, according to the marking information. The threshold level of operation is insufficient to bring about marking of indicia at the surface to be marked and provides a low level of scattered light or ASE. However, the advantage achieved is that the fiber 66 is held close to turn-ON and when modulated into operation, provides for quieter turn-ON with a reduction in the ripple at turn-ON, which ripple is illustrated at 175A in FIGS. 12 and 13.

Figure 6:
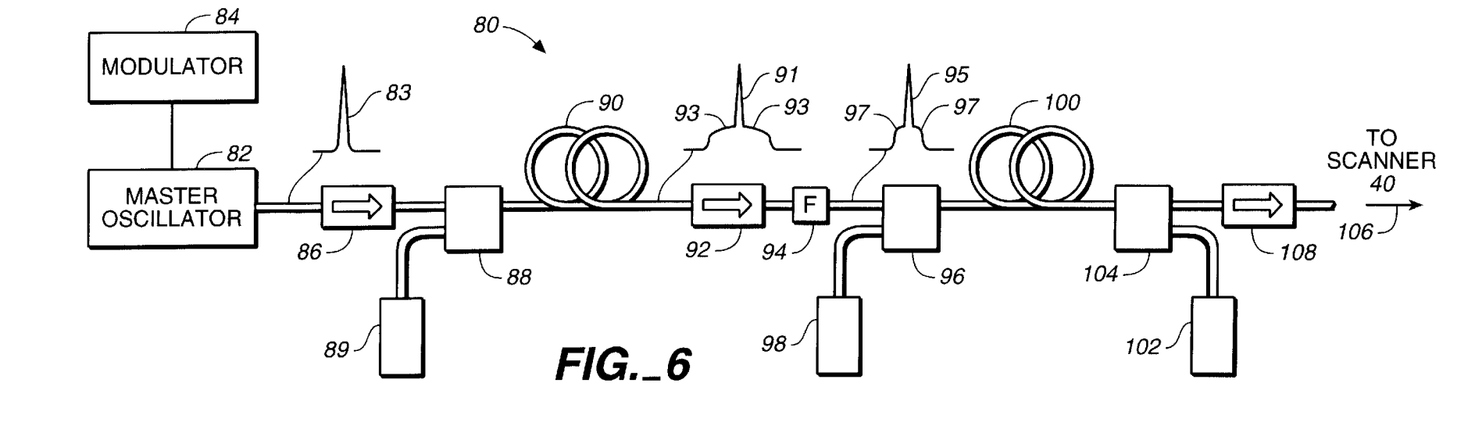
FIG. 6 is a schematic diagram of a third embodiment of a gain medium marking system comprising this invention employing a two stage double clad fiber amplifier modulated by a master oscillator comprising a seed semiconductor laser source.

Reference is now made to FIG. 6 illustrating a further embodiment of a fiber gain medium marking system 80 comprising this invention. The primary difference between previous discussed systems and system 80 is that system 80 entails the employment of fiber amplifiers for developing the marking output, particularly a pulse marking output, rather than employing a fiber laser. System 80 comprises a first stage fiber amplifier or pre-amplifier 90, which may be a single mode fiber or a double clad fiber, such as illustrated in FIG. 3, and having a core doped with Yb. Pre-amplifier 90 is pumped with a master oscillator 82 comprising a seed semiconductor laser source which may be of a type previously mentioned. As an example, source 82 may be an oscillator operating at 1090 nm which is within the gain band fiber amplifier 90 as well as second stage amplifier 100. Seed source 82 may be modulated via modulator 84 to produce a pulse light output 83 which is launched into first stage fiber amplifier 90 via isolator 86. Isolator 86 prevents any back scattered light or other optical noise from destabilizing the operation of seed source 82.

Pre-amplifier 90 is pumped by means of light pump source 89, operating at 915 nm or 975 nm, which are peak wavelengths within the absorption band of Yb. Pump source 89 is coupled to fiber 90 by means of coupler 88 as is known in the art. The output of pre-amplifier 90 is coupled as an input to second stage amplifier or power amplifier 100 via isolator 92 and filter 94. Amplifier 100 may be comprised of a double clad fiber of the type illustrated in FIG. 3 and with its core doped with Yb. Isolator 92 suppresses ASE developed in power amplifier 100, developed throughout the gain bandwidth of the amplifier, from entering into pre-amplifier 90. ASE suppression filter 94 is employed to filter out a large portion of ASE developed in pre-amplifier 90. As shown in FIG. 6, the amplified pulse 91 from the first stage amplifier includes ASE 93. It is not desirable that this ASE noise be further amplified in the second stage amplifier 100. Therefore, filter 94 provides a means for filtering out a large portion of this ASE as shown at pulse output 95 wherein the ASE 97 present in the pulse output is significantly reduced. Filter 94 comprises a narrow band interference filter consisting of a stack of thin films formed on a glass substrate which filters out wavelengths other than the linewidth at 1090 nm.

Power amplifier 100 is pumped by means of light pump source 98, operating at 915 nm or 975 nm, which are peak wavelengths within the absorption band of Yb. Pump source 98 is coupled to fiber 100 by means of coupler 96 as is known in the art. Optionally, power amplifier 100 may be provided with a second pump source 102 at its output end and coupled to fiber 100 by means of coupler 104 as is known in the art. The optical power output 106 from the dual stage system 80 is provided to scanner 40 in the manner as previously explained in connection with FIG. 2.

In operation, master oscillator 82 provides a modulated output of tens of milliwatts and provide a pulsed amplified output at 1090 nm having an average power in the range of 5 W to 10 W or higher with a pulse duration in the range of 10 nsec. to 150 nsec. with a repetition rate of 10 kHz up to cw operation.

Since, in many cases, a portion of the pulsed energy 106 from system 80 may be reflected back into amplifier 100, which could materially affect its operation or even destroy the amplifier depending upon the level of reflected light, isolator 108 is inserted in the output of amplifier 100 to block this reflected light. Higher reflectivity is experienced when the article surface is significantly reflective at the wavelength of operation of system 80.

The peak pulse output power from system 80 is limited by Raman gain to less than approximately 10 kW because of fiber nonlinearities, shifting output wavelength by hundreds of nanometers. As a result, a broad spectrum of light pulse output will be observed and the peak powers will not be as high. This will affect marking capabilities of the system since the material comprising the article to be marked with indicia is wavelength sensitive; however, there are some applications where this is not a problem, such as in the case of various plastic materials.

Figure 7:
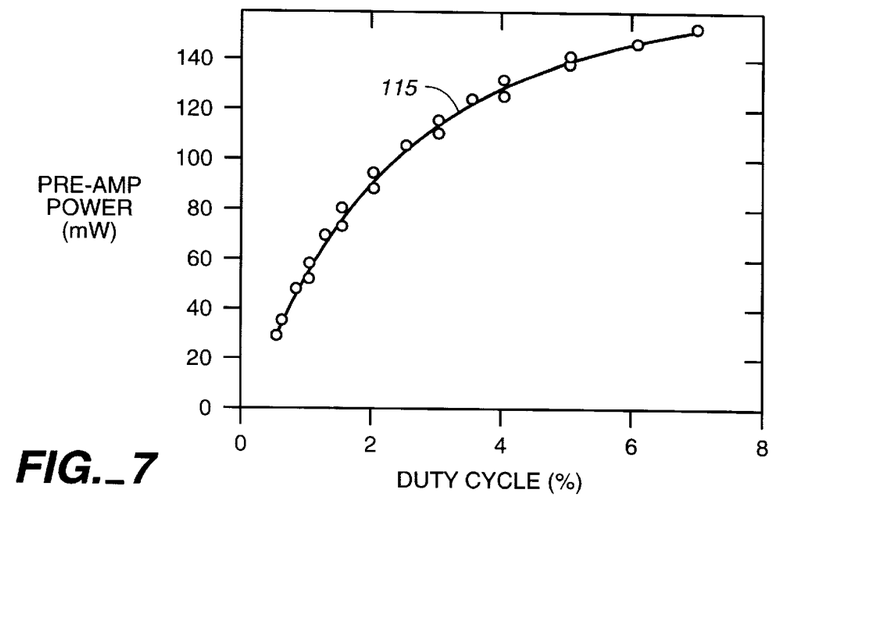
FIG. 7 is a graphic illustration of the power output from the first stage of the two stage double clad fiber amplifier of FIG. 6 as a function of the master oscillator duty cycle.

Reference is now made to FIG. 7 which shows operational data relative to preamplifier 90. Shown in FIG. 7 is the 1090 nm pre-amplifier power output as a function of duty cycle of master oscillator 82. With an adjusted master oscillator drive current to provide an at output at 25 mW, the maximum output power generated by fiber pre-amplifier 90 at a maximum duty cycle of 8% was 145 mW. Pre-amplifier gain saturates around 30 dB.

Figure 8:
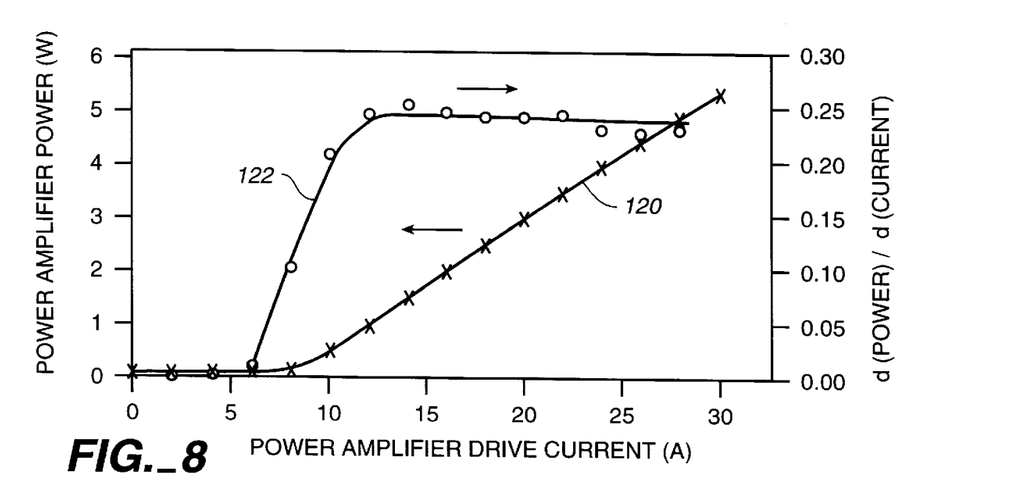
FIG. 8 is a graphic illustration of the power output from the second stage power amplifier pump oscillator drive current.

FIG. 8 shows the pulsed power output from power amplifier 100 as a function of the drive current, $I_{OP}$, at curve 120 with a 1% duty cycle. Curve 122 is the derivative of the power-versus-current curve for master oscillator 82 so that, at about threshold operation of the master oscillator, the increase of power amplifier output power is linear with increase in drive current of master oscillator 82. Other tests made with a 0.5% duty cycle (100 nsec. at 50 kHz) at an operating drive current of 30A provides to peak output power pulse of approximately 1 kW. No SBS effects or significant ASE effects were observed.

Figure 9:
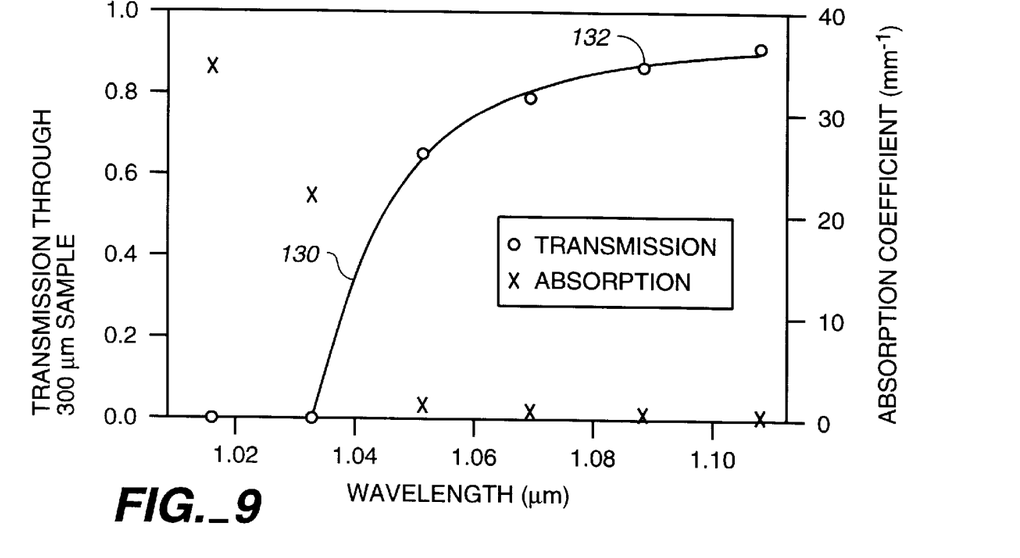
FIG. 9 is a graphic illustration of the wavelength transmission through a 300 $\mu$m thick silicon sample as a function of wavelength of marking beam light with the absorption coefficient for silicon shown at the right side of the illustration.

As previously indicated, marking of materials is wavelength sensitive so that marking systems designed for 1090 nm, which is approximate of the wavelengths used in YAG laser marking systems, are not suitable for marking many materials because the operational wavelength region of the system may be transmissive, rather than absorptive, of the marking output. Thus, no viable marking will occur. One particularly important material is silicon wafers which has a refractive index of 3.53 and a Fresnel reflection of about 31%. As shown in FIG. 9, silicon does not absorb well for wavelengths above 1,000 nm as seen by curve 130. As the near-IR marking wavelength is increased, the transmission of light into the silicon material increases. Point 132 is the point for wavelength 1090 nm, also common to current YAG laser marking systems. What is needed is a fiber gain medium marking system that provides for wavelengths less than 1,000 nm, preferably well below in the visible wavelength range, such as wavelengths within the green spectrum which are absorbed within the silicon surface within a few mirons or less. The marking mechanism at these wavelengths, below the bandgap energy of silicon, can be significantly different than at the near-IR wavelength, permitting the use of lower power marking laser systems.

Figure 10:
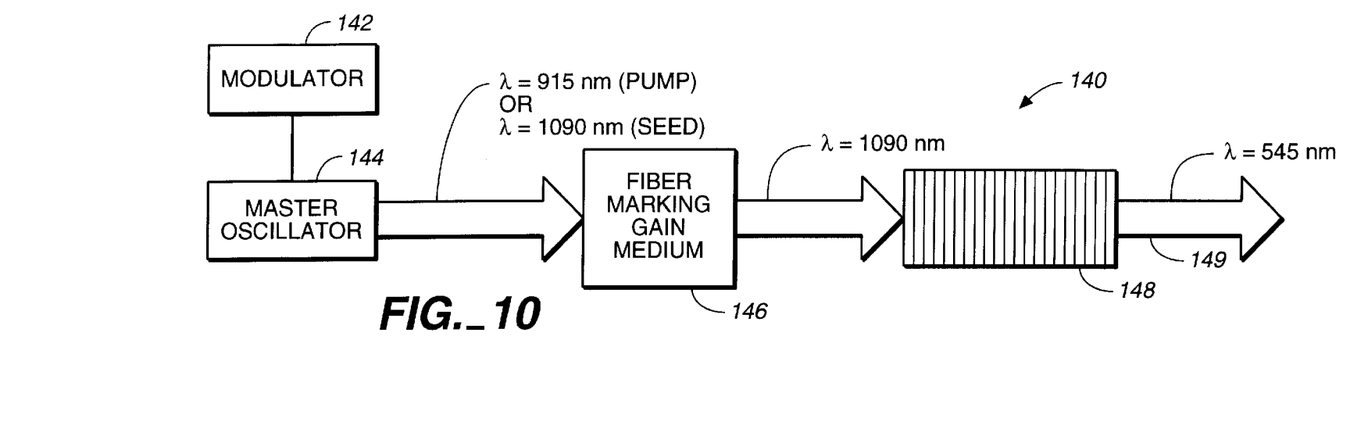
FIG. 10 is a fiber gain medium marking system especially suited for marking articles at frequency converted wavelengths which are absorptive at the marking surface of an article to be marked.

Also, marking laser system 80 can be particularly sensitive to reflections from the surface of the article, such as silicon on aluminum, to be marked can have a significant effect on the operation of the system 80. The reflection from the markig sample is compounded by the relatively high gain in power amplifier 100. This problem may be solved by the employment of isolator 108 at the output of power amplifier 100. Isolator 108 can handle high peak powers and is polarization insensitive. Isolator may be fiber-coupled or independent of the fiber at the output of fiber 100. Another solution for reducing such reflection effects is to reduce the total power amplifier gain of system 80. This is achieved by including a second pre-amplifier stage between amplifiers 90 and 100 to increase the power level to power amplifier 100, e.g., up to approximately 1 W. The limiting effects of this approach are the limits of power handling capability of the isolators, such as isolator 92, and the added cost to the laser marking system. However, a more preferred solution is shown in FIG. 10 comprising a fiber marking system 140. System 140 comprises master oscillator 144, which is modulated by current driver and modulator 142, which produces a pulsed pump output at, for example, at a wavelength of 915 nm or a pulsed seed output at, for example, at a wavelength of 1090 nm. This pulsed pump output is provided to fiber gain medium marking 146 which may of the type shown in FIGS. 2 or 3, but preferably is two stage fiber amplifier system 80 of FIG. 6 and produces pulsed output at 1090 nm. Fiber gain medium 146 is preferably composed of a double clad fiber amplifier or fiber laser doped with a rare-earth dopant, such as Yb, Nd or Er or codoped with Yb:Er. The marking output from gain medium 146 is launched into a frequency conversion device 148. The input to crystal device 148 can be accomplished with a coupling lens system, such as a pair of spherical or a spherical lenses as is known in the art. An important advantage and utility in the employment of a double clad fiber as medium 146 is that it provides for a diffraction limited spot that is of better quality for focusing into crystal medium 148 than is capable of being obtained from the output of a semiconductor laser source itself. Frequency conversion device 148 may be comprised of a noncritical, single pass, quasi-phase matching (QPM), second harmonic generation (SHG), periodically poled nonlinear optical crystal device, for example, made from such material as $LiTaO_3$, $LiNbO_3$, KTP, $AgGaS_2$ or $AgGaSe_2$, as is known in the art. Device 148 is polled in manner that is well known in the art to provide frequency doubling to pulsed output producing an out-put at 550 nm within the visible light range of green, which can be applied via scanner 40 (FIG. 2) to a silicon surface for marking. Device 148 may be operated as a bulk device or may have a patterned waveguide as is known in the art. Thus, system 140 provides an optical output that is at a wavelength that will be absorbed within the first few microns of the silicon surface to remove and otherwise change the surface contrast to form discernible indicia on the silicon surface.

Frequency conversion device 148 may alternatively be comprised of a bulk phase matching device that may be angled tuned or temperature tuned, as is known in the art.

In the employment of PPLN device as frequency conversion 148, it is best to utilized a master oscillator source 144 that provides an output wavelength that is continuously both spatially and spectrally single mode at a maintain wavelength, such as disclosed in U.S. application Ser. No. 09/001,769, filed Dec. 31, 1997 and entitled ANGLED DISTRIBUTED REFLECTOR OPTICAL DEVICE WITH ENHANCED LIGHT CONFINEMENT, owned by the assignee herein and incorporated herein by its reference, comprising an α-DFB master oscillator source.

It is important to note with respect to this invention that the efficiency of PPLN device 148 increases with increased input power, for example, an increase of 1% per watt increase. Therefore, the utilization of a pulsed marking system 140 is highly desirable since high pulse peak powers, such as up to 1 kW peak power, for example, give the most efficient frequency doubling. Therefore, a highly efficient pulsed fiber gain medium marking system is achieved in the short wavelength visible range of light which is highly suitable for marking on silicon surfaces of a silicon wafer without necessitating high temperature marking applications or forming deep profile marking in the silicon wafer both of which may affect the integrity of an integrated circuitry formed in the silicon wafer.

Figure 11:
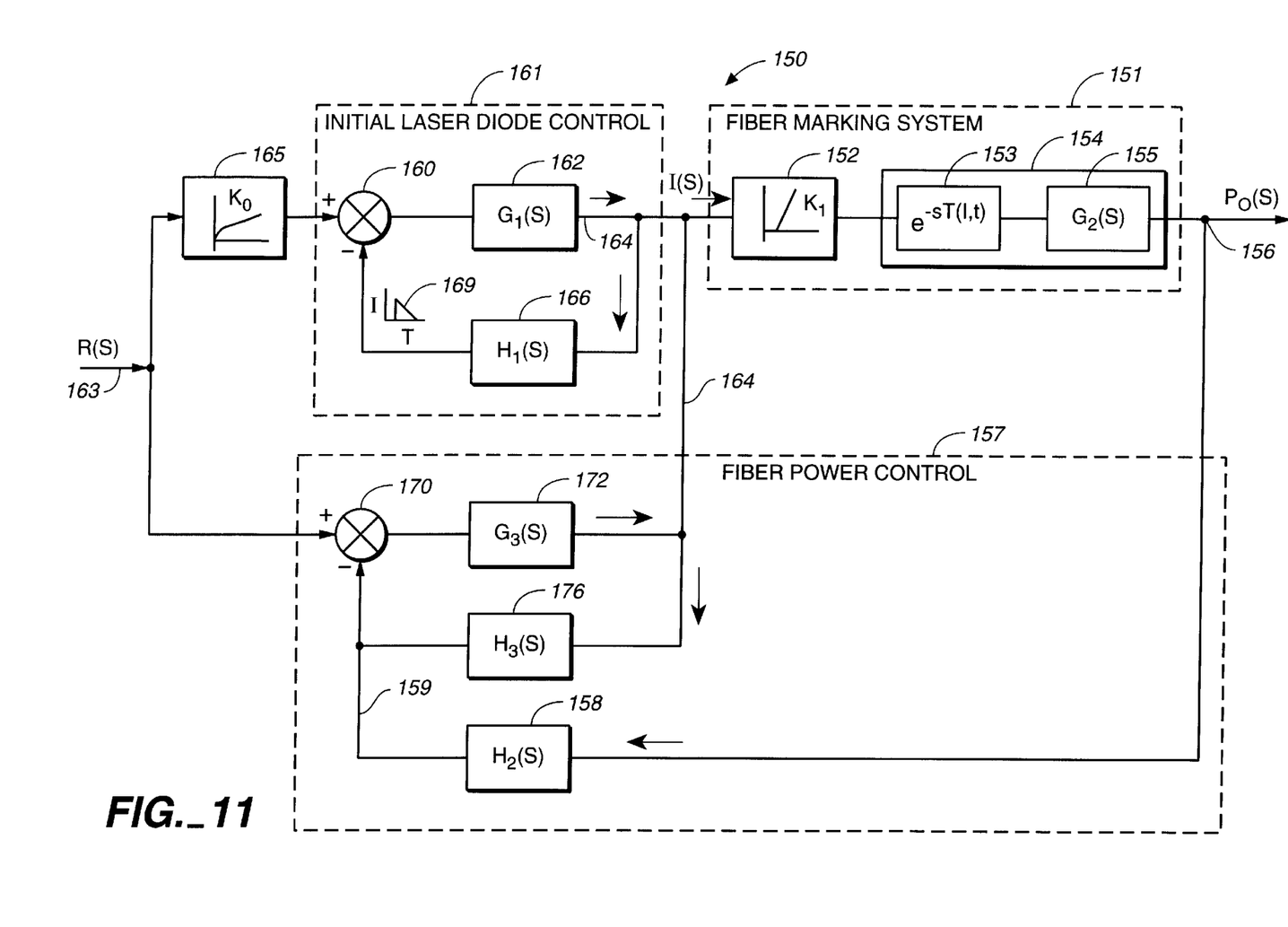
FIG. 11 is a schematic diagram of a circuit for controlling the operation of a fiber gain medium marking system.

Reference is now made to FIG. 11 which illustrates a pulse control circuitry 150 that may be employed in conjunction with the drive current control of the laser diode sources for any of the previously described embodiments. The drive current circuitry shown in FIG. 4 of the incorporated parent application Ser. No. 09/085,142, may also be employed in connection with any of the foregoing embodiments. However, circuitry 150 provides an additional feature in the power control electronics for double clad fiber gain medium marking system by providing a faster initial ON-time response between the ON-time of the drive current signal, I(s), and the marking output, $P_0$(s) from the system through the provision of, in part, of a higher initial peak drive current at the beginning of the ON-time period of the drive current signal, I(s).

Circuitry 150 has a master oscillator which comprises semiconductor laser pump or seed source 152 provided with a current signal, I(s), input on line 164 from current driver circuit 162. The optical output from laser diode pump source 152 is provided as input to double clad fiber marking medium 154 which has a delay time due to its population inversion function 153 and provides stimulated lasing operation 155 to produce an optical power output, $P_0$(s), at 156. A portion of output 156 is feedback for control of the intensity of the marking output, regardless of its frequency or duty cycle. Signal conversion from optical to electrical signal and amplification is accomplished at circuit 158 and this electrical feedback signal is provided on line 159 as an input to comparator 170 for comparison with a reference signal, R(s), at 163.

This circuitry thus far provides means for monitoring the output intensity of fiber gain medium 154 and providing a signal on line 164 from comparator 170, drive current circuit 172, for producing an appropriate drive current signal, I(s), to maintain steady-state intensity during the duration of optical output signal, $P_0$(s). However, due to the delay function 153 in fiber gain medium 154, there is no initial output at 156 to make an initial determination of the amount of current for the ON-time of laser source 152. As a result, the powering of laser pump source 152 will cause an overshoot in the optical output at 156 at the commencement of the optical power output ON-time from fiber marking system 154. Also, in reference to the delay between the ON-time of pump source 152 and the optical power output from fiber marking system 154, it is desirable to make this delay as small as possible as well as provide a rise-time of the ON-time for pump source 152 which would translate optically to a correspondingly steep rise-time during the commencement of the optical power output ON-time from system 151. The circuitry 150 provides for a decrease in the delay between the ON-time of the operation of the drive current, I(s), and the operation of the marking output, $P_0$(s).

Circuitry 150 includes two separate compensation circuits, laser diode control circuit 161 and fiber power control circuit 157. Control circuit 161 is substantially the same as the current compensation circuit shown in the referenced parent patent application comprising a first drive current circuit 162 in combination with a feedback loop and first compensation circuit 166 to first comparator 160 at the input of drive current circuit 162. Comparator 160 also receives a reference signal 163, via non-linear function circuit 165, for providing a comparison signal output from comparator 160 to drive current circuit 162. Circuit 166 provides a time dampening overdrive signal 169 based upon the initial rise time of drive current signal on line 164 to temper the rise time of signal, I(s), to its peak level. In operation, control circuit 161 operates substantially in the same manner as the drive current circuit in FIG. 4 of the referenced parent application in that it provides an initial drive current signal prior the optical output response of fiber marking system 151 during an initial portion of the ON-time of the drive current signal, e.g., within the first 200 microseconds of the ON-time. However, it differs from the previous control circuit in providing a small overdrive in the peak current level of laser diode source 152, which is illustrated at 177A of drive current signal 170B in FIG. 13, producing an optical marking output 172B that is also of higher value as seen at 178A.

Fiber power control circuit 157 comprises a dampening overdrive effect similar to that of circuit 161 and is operative after the initial drive current control time period of operation has elapsed. Upon initiation of marking output 156 from fiber marking system 151, such as after the expiration of dampening overdrive signal 169, fiber power control circuit 157 takes over the function of feedback control as a second compensation circuit and adjusts the laser diode drive current, I(s), to provide a clamped level comprising the desired optical output level provided at output 156. Second compensation control loop circuit 157, as previously indicated, provides for optical to electrical signal conversion via circuit 158 and provides an electrical feedback signal on line 159 for comparison with reference signal, R(s), presented at its normal level as an input to comparator 170. Dissipating overdrive circuit 176 functions similar to circuit 166 for the purpose of optimizing optical time response. Once fiber power control circuit 157 is operating, the response time of this circuit is faster than the response time of the initial laser diode control circuit 161 so that circuit 157 remains in continuous control via second drive current circuit 172 for providing drive current signal, I(s), on line 164 to pump or signal source 152 until extinction of the ON-time period of signal, I(s).

Figure 12:
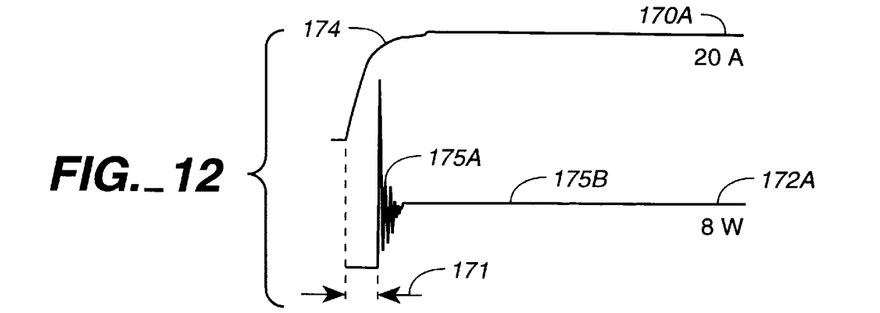
FIG. 12 are examples of the ON-time rises for both the current driver signal, I(s), and the optical output signal, $P_0$(s), for a laser marking gain medium system without the benefit of the circuit control shown in FIG. 11.
Figure 13:
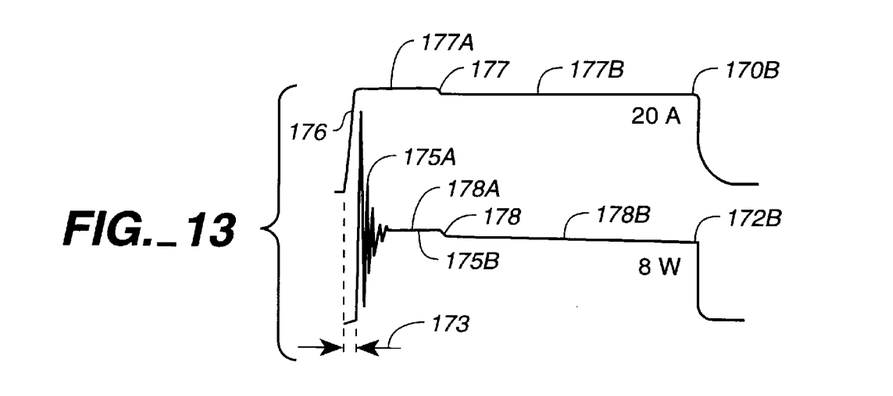
FIG. 13 are examples of the ON-time rises for both the current driver signal, I(s), and the optical output signal, $P_0(s)$, for a laser marking gain medium system utilizing the circuit control shown in FIG. 11.

A comparison of the results achieved relative to circuitry 150 over previous control circuitry illustrated in the parent application is illustrated by the waveforms of FIGS. 12 and 13. In FIG. 12, there is shown drive current, I(s), in connection with a drive current circuit employed and illustrated in the parent application. It can be seen that current signal 170A has a relatively slow rise response time at 174 so that there is a delay 171 of several hundreds of microseconds before the ON-time of optical marking output 172A is produced at output 156 in FIG. 11. As noted in both FIGS. 12 and 13, there is an initial resonance or ripple 175A at the beginning of the ON-time of the marking output 172A or 172B. However, this ripple has no effect on the marking process since it is dissipated to a steady-state condition at 175B during a time in which the galvanometer mirrors in scanner 40 may be in the process of adjustment in preparation for the beginning of a marking stroke.

FIG. 13 shows the drive current signal, I(s), at 170B and the corresponding optical marking output 172B in the case of operation of circuitry 150. As can be seen in FIG. 13, the rise of ON-time for drive current signal 170B is much steeper to its peak level, as shown at 176 in FIG. 13, than in the case of signal 170A at 174 in FIG. 12. Also, the peak level at 177A is initially higher during operation of laser diode control circuit 161 and clamps to a lower steady-state level upon operation of fiber power control circuit 157 as seen at 177B of current signal 170B. There is a change in the power level of the drive current signal due to transition of operation from circuit 161 to circuit 157. This transition is indicated at 177 of current signal 170B in FIG. 13. This same change in transition level also appears in the marking output 172B at 178 but not as much as a difference as in the case of the drive current transition 177. The change from optical output level from 178A to 178B is sufficiently small so that there is not noticeable change in the produced mark stroke profile, i.e., the difference in the optical power delivered to the marking surface is so small that there is no significant change in the characteristics of the marking stroke being formed with the scanned output comprising signal 172B.

It should be observed that the delay 173 between initiation of drive current signal, I(s), and ON-time of optical marking output, $P_0(s)$, is significantly reduced compared to the delay 171 shown in FIG. 12, as much as an order of one-half magnitude. Thus, circuitry 150 improves input response time and operation of the fiber marking system output, $P_0(s)$, by overshooting the initial current peak level of the drive current signal, I(s), via circuit control 161. prior to steady-state feedback operation, via fiber power control 157, achieved by feedback of a portion of the marking output, $P_0(s)$.

Although the invention has been described in conjunction with one or more preferred embodiments, it will be apparent to those skilled in the art that other alternatives, variations and modifications will be apparent in light of the foregoing description as being within the spirit and scope of the invention. For example, while most of the embodiments herein have been explained in conjunction with a two dimensional scanner, it should be noted that other scanning techniques can be employed for deployment of the marking output. For example, the marking output can remain stationary and the article to be marked can be moved in one, two or three dimensions, such as on a X-Y to achieve the formation of the indicia on the article surface. Also, for large indicia in particular, the marking output can be moved manually by an X-Y mechanical mechanism where the operator moves the marking output housing, e.g., housing 39 through mechanically operated drive mechanisms. Thus, the invention described herein is intended to embrace all such alternatives, variations and modifications that may fall within the spirit and scope of the following claims.

What is claimed is:

1. A fiber gain medium system comprising:
   a marking laser comprising double clad fiber having a doped core surrounded by an inner pump cladding of a prescribed cross-sectional geometry and providing a marking output;
   a plurality of semiconductor laser sources for pumping said double clad fiber and comprising a plurality of discrete, separately mounted laser diodes and modulated to provide a modulated output from said marking laser the output of said discrete laser diodes combined together; said combined output coupled to said double clad fiber inner pump cladding so that brightness conservation is achieved;
   an optical scanner coupled to receive the marking output from said marking laser as modulated by said discrete laser diodes and scan the marking output over a surface of an article to be marked; and
   a controller to control the operation of said optical scanner in synchronism with modulation of said discrete laser diodes to initiate said modulated marking output in multiple directions via said optical scanner to form strokes comprising discernable indicia on the article surface.

2. The fiber gain medium system of claim 1 wherein said laser diodes are broad area diode lasers.

3. The fiber gain medium system of claim 2 wherein said broad area lasers have an aperture of about 100 μm or more.

4. The fiber gain medium system of claim 1 wherein the cross-sectional geometry comprising said multimode core is inscribed to be within the cross-sectional geometry of said inner pump cladding.

5. The fiber gain medium system of claim 1 further comprising a plurality of multimode fibers each with a multimode core respectively coupled at their input ends to receive an output from said laser diodes, said multimode fibers fused at their output ends to form a fiber combiner, said fused output ends together forming a single multimode output for coupling to said double clad fiber.

6. The fiber gain medium system of claim 1 wherein said inner pump cladding cross-sectional geometry is circular.

7. The fiber gain medium system of claim 1 wherein said inner pump cladding cross-sectional geometry is polygon.

8. The fiber gain medium system of claim 7 wherein said inner pump cladding cross-sectional geometry is octagon-shaped.

9. The fiber gain medium system of claim 1 wherein said discrete laser diodes are modulated in unison.

10. The fiber gain medium system of claim 1 wherein said discrete laser diodes are independently modulated relative to one another to achieve different marking contrasts to said indicia.

11. The fiber gain medium system of claim 1 wherein said double clad fiber comprises a fiber laser or fiber amplifier.

12. The fiber gain medium system of claim 1 further comprising an isolator provided between said double clad fiber and said optical scanner for preventing light reflected from the surface of the article from being fed back into said double clad fiber.

13. The fiber gain medium system of claim 1 further comprising:
means to divide said modulated marking output into a plurality of outputs for simultaneous marking of surfaces of a plurality of articles.

14. The fiber gain medium system of claim 1 wherein said double clad fiber comprises a fiber amplifier; said discrete laser diodes coupled to the core of said double clad fiber for providing a seed input for amplification by said fiber amplifier, and means for pumping said amplifier.

15. The fiber gain medium system of claim 1 wherein said double clad fiber comprises multiple fiber amplifiers.

16. The fiber gain medium system of claim 1 further comprising an isolator provided at the optical output of said double clad fiber for preventing light reflected from the surface of the article from being fed back into said double clad fiber.

17. The fiber gain medium marking system of claim 1 wherein said double clad fiber comprises a fiber laser; said discrete laser diodes coupled to a double clad fiber inner cladding for providing a pump input to said fiber laser.

18. The fiber gain medium marking system of claim 17 further comprising an isolator provided at the optical output of said double clad fiber for preventing light reflected from the surface of the article from being fed back into said double clad fiber.

19. The fiber gain medium system of claim 1 wherein at least one of said laser diodes is operated continuous wave (cw) to maintain said doped double clad fiber approximate to its operational threshold while the remainder of said laser diodes are modulated to provide a modulated output to said doped double clad fiber.

20. The fiber gain medium system of claim 1 wherein the outputs of said discrete laser diodes are combined together into a multimode fiber.

21. A fiber gain medium marking system comprising:
a double clad fiber having a doped core surrounded by an inner pump cladding and providing an optical output for marking at wavelengths in excess of 1,000 μm due to the inherent gain bandwidth of said fiber;
a semiconductor laser source for pumping or seeding said double clad fiber;
an optical scanner coupled to receive the optical output from said double clad fiber for scanning said output in at least one dimension over a surface of an article to be marked with said output;
said article comprising a silicon surface with optimum absorption range at wavelengths below about 1,000 μm; and
a frequency conversion device provided in optical alignment between the marking output of said double clad fiber and said optical scanner for frequency doubling of said double clad fiber marking output to provide a wavelength below about 1,000 μm within the optimum absorptive range of the silicon surface.

22. The fiber gain medium system of claim 21 wherein said frequency conversion device is a quasi-phase matching device.

23. The fiber gain medium system of claim 22 wherein said quasi-phase matching device is a periodically polled lithium niobate (PPLN) device.

24. The fiber gain medium system of claim 21 wherein said frequency conversion device is a bulk phase matching device.

25. The fiber gain medium system of claim 24 wherein said bulk phase matching device comprises angle tuning or temperature tuning.

26. The fiber gain medium system of claim 21 wherein the optimum absorptive range of the silicon surface is within the green spectrum of light.

27. A fiber gain medium system comprising:
a marking laser comprising double clad fiber having a doped core surrounded by an inner pump cladding and providing a marking output;
a semiconductor laser source for pumping or seeding said marking laser;
a drive circuit for providing a modulated output for controlling a current level provided to said semiconductor laser source and, correspondingly, the optical output intensity level provided to said marking laser;
an optical scanner coupled to receive the marking output from said marking laser as modulated by said semiconductor laser source and scan said marking output over a surface of an article to be marked;
a controller to control the operation of said optical scanner in synchronism with modulation of said semiconductor laser source to provide a modulated marking output from said scanner scanned in multiple directions to form strokes comprising discernable indicia on the article surface; and
a circuit control to provide an initially higher peak value in the initiation of the modulated marking output prior to a subsequent steady-state condition to produce a faster initial ON-time response between an application of the modulation of the semiconductor laser source and the modulated output of said marking laser.

28. The fiber gain medium system of claim 27 further comprising means for detecting the optical output power level of said optical output from said double clad fiber; and feedback means for comparing the detected power level with a desired power level and adjusting said current level to maintain said optical output power level at said desired power level.

29. The fiber gain medium system of claim 27 wherein said double clad fiber is a fiber laser.

30. The fiber gain medium system of claim 27 wherein said double clad fiber is a fiber amplifier.

31. A method of energy control in a fiber gain medium comprising the steps of:

providing a drive circuit for producing a modulated output to control the light output provided from a laser diode source pumping or seeding a fiber marking gain medium;

modulating the diode laser source to provide a corresponding modulated marking output;

scanning the modulated marking output over a surface of an article to be marked in multiple directions to form strokes comprising discernable indicia on the article surface;

controlling the operation of the optical scanner in synchronism with modulation of the laser diode source to provide a modulated marking output from the scanner with scanning thereof in multiple directions to form strokes comprising discernable indicia on the article surface;

controlling the modulated marking output to have an ON-time period with an initial peak value at the beginning of the ON-time period higher than a subsequent steady-state condition of the period; and reducing the rise time to the initial peak value at the beginning of an ON-time period of the modulated marking output prior to clamping the same to its subsequent steady-state condition reducing the response time between initiation of the modulated marking output and the onset of the laser diode modulated output.

32. The method of energy control of claim 31 comprising the further step of optically isolating the fiber gain medium from any light reflected back from the surface of the article.

33. The method of energy control of claim 31 wherein said fiber gain medium is a fiber laser.

34. The method of energy control of claim 33 comprising the further step of optically isolating the fiber laser from any light reflected back into the fiber laser.

35. The method of energy control of claim 31 wherein said fiber gain medium is a fiber amplifier.

36. The method of energy control of claim 31 wherein said fiber gain medium is a plurality of fiber amplifiers.

37. A fiber gain medium system comprising:

a gain medium comprising a fiber having a doped core and providing an optical marking output;

a plurality of semiconductor laser sources for pumping said gain and comprising a plurality of discrete, separately mounted laser diodes and modulated to provide a modulated output from said gain medium;

an optical scanner coupled to receive the marking output from said marking laser as modulated by said discrete laser diodes and scan the marking output over a surface of an article to be marked; and a controller to control the operation of said optical scanner synchronously with combined modulation of said discrete laser diodes to initiate said modulated marking output in multiple directions via said optical scanner to form strokes comprising discernable indicia on the article surface;

said discrete laser diodes independently modulated relative to one another to achieve different marking contrasts for said discernable indicia.

38. The fiber gain medium system of claim 37 wherein the outputs of said discrete laser diodes are combined together into a multimode core of a multimode fiber.

39. The fiber gain medium system of claim 37 further comprising a plurality of multimode fibers each with a multimode core respectively coupled at their input ends to receive an output from said laser diodes, said multimode fibers fused at their output ends to form a fiber combiner, said fused output ends together forming a single multimode output for coupling to said double clad fiber.

40. The fiber gain medium system of claim 37 wherein said modulated marking output is divided into a plurality of outputs for simultaneous marking of surfaces of a plurality of articles.

41. The fiber gain medium system of claim 37 wherein said gain medium is a fiber laser or a fiber amplifier.

* * * * *